United States Patent
Pacini

(10) Patent No.: US 10,037,680 B1
(45) Date of Patent: Jul. 31, 2018

(54) SYSTEM AND METHOD FOR ANALYZING INFORMATION PERTAINING TO A PLURALITY OF USERS FOR MANAGING THE MOVEMENT OF THE PLURALITY OF USERS PRESENT IN A PRE-DEFINED GEOGRAPHICAL AREA

(71) Applicant: Maria Cristina Pacini, Kelowna (CA)

(72) Inventor: Maria Cristina Pacini, Kelowna (CA)

( * ) Notice: Subject to any disclaimer, the term of this patent is extended or adjusted under 35 U.S.C. 154(b) by 0 days.

(21) Appl. No.: 15/422,688

(22) Filed: Feb. 2, 2017

(51) Int. Cl.
*G08B 25/01* (2006.01)
*H04B 5/00* (2006.01)

(52) U.S. Cl.
CPC ......... *G08B 25/016* (2013.01); *H04B 5/0025* (2013.01)

(58) Field of Classification Search
CPC .... G08B 25/00; G08B 25/016; G08B 25/045; H04B 5/0025; G06Q 10/063114; G06Q 10/0635; G06Q 10/0639; H04W 4/008; H04W 4/22; H04W 4/02; H04W 4/021
USPC .... 340/539.1, 539.11, 539.12, 539.13, 573.1
See application file for complete search history.

(56) References Cited

U.S. PATENT DOCUMENTS

| | | | | |
|---|---|---|---|---|
| 6,424,264 B1* | 7/2002 | Giraldin | ................. | G06K 17/00 340/539.1 |
| 8,284,748 B2* | 10/2012 | Borghei | ................ | H04W 4/021 370/252 |
| 9,471,900 B1* | 10/2016 | Boustany | ................. | G07C 1/10 |
| 2006/0132300 A1* | 6/2006 | Howe, Jr. | ........... | G07C 9/00111 340/539.13 |
| 2011/0003601 A1* | 1/2011 | Coutts | ................ | G08B 21/0415 455/456.1 |
| 2014/0203909 A1* | 7/2014 | Elgebaly | ................ | G06Q 10/06 340/8.1 |
| 2015/0285659 A1* | 10/2015 | Curtis | .................. | G01C 22/006 702/97 |
| 2016/0055236 A1* | 2/2016 | Frank | ................ | G06F 17/30702 707/748 |

* cited by examiner

*Primary Examiner* — Hung T Nguyen

(57) ABSTRACT

Disclosed is a system and method for analyzing information pertaining to a plurality of users for managing movement of the plurality of users such as crowd present in a pre-defined geographical area. The system includes a database, a wearable unit, and a processing unit. The database configured stores plurality of user IDs corresponding to plurality of users. The wearable unit includes one or more sensors, and a communication unit. The sensors acquire user information, wherein the wearable unit has a unique user ID and the user information includes at least one of: physiological information, quality of air around user, and location of the user. The communication unit to transmit the user information over the communication network. The processing unit communicatively configured with the database in order to perform analysis of the user information received from the wearable unit and further transmits one or more command data to the communication unit.

20 Claims, 4 Drawing Sheets

US 10,037,680 B1

SYSTEM AND METHOD FOR ANALYZING INFORMATION PERTAINING TO A PLURALITY OF USERS FOR MANAGING THE MOVEMENT OF THE PLURALITY OF USERS PRESENT IN A PRE-DEFINED GEOGRAPHICAL AREA

TECHNICAL FIELD

The present invention is generally related to a wearable device for managing plurality of users, particularly to a system and a method for analyzing information pertaining to a plurality of users for managing the movement of the plurality of users present in a pre-defined geographical area.

BACKGROUND

With population explosion, and urbanization a lot of people visiting religious congregation, malls, stadium etc. There is a probability of increase in the visitors at such events that causes the crowd disasters. For example, Hajj is performed within a five-day period each year within designated boundaries inside the city of Mecca. Around 3 to 4 million pilgrims visit Mecca each year during the Hajj, the number is increasing every year. In 2015 Hajj, over 2500 people pilgrims died during this event due to accident of stampede in Mina.

The main causes of the crowd disasters are: more than anticipated crowd at store/mall/political rallies/examinations/religious gathering/public celebration, under estimation of audience, lack of access control, pilgrims rushing to complete the rituals, pushing against each other in opposite directions inside overcrowded areas, lost with the groups and confusion among the many first-timers. Various stampedes caused death of people at various places such as train stations, football stadiums all over the world, and temples etc.

Generally, the crowd disasters are manmade which can be prevented. Therefore there is a need of a system and a method for analyzing information pertaining to a plurality of users for managing the movement of the plurality of users present in a pre-defined geographical area.

Further limitations and disadvantages of conventional and traditional approaches will become apparent to one of skill in the art through comparison of described systems with some aspects of the present disclosure, as set forth in the remainder of the present application and with reference to the drawings.

SUMMARY OF THE INVENTION

A system for analyzing information pertaining to a plurality of users for managing movement of the plurality of users such as crowd present in a pre-defined geographical area is provided substantially, as shown in and/or described in connection with at least one of the figures, as set forth more completely in the claims.

According to the embodiments illustrated herein, a system for analyzing information pertaining to a plurality of users for managing movement of the plurality of users such as crowd present in a pre-defined geographical area over a communication network is provided. The system includes a database, a wearable unit, and a processing unit.

The database configured stores plurality of user IDs corresponding to plurality of users. The wearable unit includes one or more sensors, and a communication unit. The sensors acquire user information, wherein the wearable unit has a unique user ID and the user information includes at least one of: physiological information, quality of air around user, and location of the user. The communication unit to transmit the user information over the communication network. The processing unit communicatively configured with the database in order to perform analysis of the user information received from the wearable unit and further transmits one or more command data to the communication unit.

According to the embodiments illustrated herein, a method for analyzing information pertaining to a plurality of users for managing movement of the plurality of users such as crowd present in a pre-defined geographical area over a communication network is provided.

The method includes the step of storing a plurality of user IDs corresponding to the plurality of users through a database configured with the communication network. The method further includes the step of acquiring user information through one or more sensors integrated into a wearable unit operatively connected to the communication network. The wearable unit has a unique user ID and the user information includes at least one of: physiological information, quality of air around user, and location of the user.

Further, the method includes the step of transmitting the user information over the communication network through a communication unit. Then the method includes the step of performing analysis of the user information received from the wearable unit and further transmitting one or more command data to the communication unit through a processing unit communicatively configured with the database.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1:
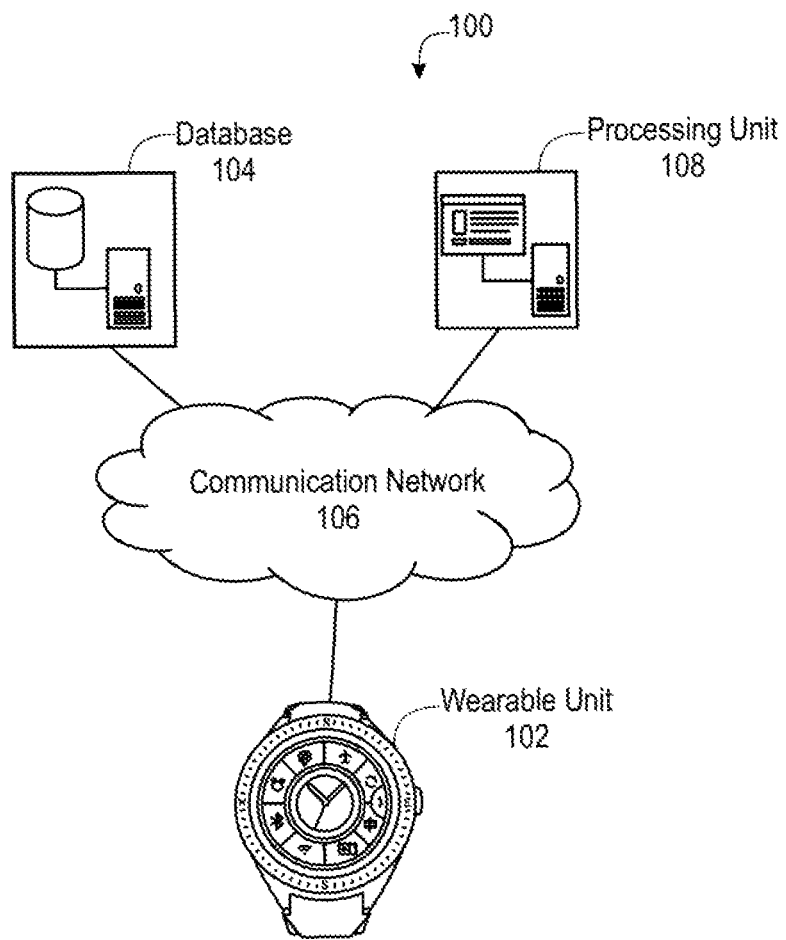
FIG. 1 illustrates an environmental diagram of the system for analyzing information pertaining to a plurality of users for managing the movement of the plurality of users present in a pre-defined geographical area over a communication network, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of the ordinary skills in the art to which this invention belongs. Although any method and material similar or equivalent to those described herein can also be used in the practice or testing of the present invention, the preferred methods and materials have been described. All publications, patents, and patent applications mentioned herein are incorporated in their entirety.

It is noted that as used herein and in the appended claims, the singular forms "a", "and", and "the" include plural referents, unless the context clearly dictates otherwise. In the claims, the terms "first", "second", and so forth are to be interpreted merely as ordinal designations; they shall not be limited in themselves. Furthermore, the use of exclusive terminology such as "solely", "only", and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references cited herein, including publications, patent applications, and patents, are hereby incorporated by reference to the same extent as if each reference were individually and specifically indicated to be incorporated by reference, and were set forth in its entirety herein.

The recitation of ranges of values herein is merely intended to serve as a shorthand method of referring individually to each separate value falling within the range, unless otherwise indicated herein, and each separate value is incorporated into the specification as if it were individually recited herein.

FIG. 1 illustrates an environmental diagram of the system 100 for analyzing information pertaining to a plurality of users for managing the movement of the plurality of users present in a pre-defined geographical area over a communication network 106, in accordance with at least one embodiment. The system 100 includes a database 104, a wearable unit 102, and a processing unit 108.

In an embodiment, the communication network 106 includes a medium through which a database 104, wearable unit 102, and the processing unit 108 communicate with each other. Such a communication is performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The database 104 configured with the communication network 106 to store a plurality of user IDs corresponding to the plurality of users. The database 104 further stores physical behavior such as movement and location of each user registered within the same group. The database 104 is realized through various technologies such as, but not limited to, Microsoft® SQL Server, Oracle®, IBM DB2®, Microsoft Access®, PostgreSQL®, MySQL®, Mongo, Oracle, and SQLite®, and the like.

The wearable unit 102 operatively connected to the communication network 106. The wearable unit 102 includes one or more sensors (shown and explained in conjunction with FIGS. 2-6), a communication unit (not shown in FIGS.), a camera unit (not shown in FIGS.), a speaker unit (not shown in FIGS.), a control unit (not shown in FIGS.), an alert module (shown and explained in conjunction with FIG. 5), and a NFC unit (not shown in FIGS.). Each wearable units 102 has a unique user ID.

The one or more sensors acquire user information. The user information includes but not limited to physiological information, quality of air around user, location of the user, walking, running, climbing, speed, movement of the user, heart rate of the user. The communication unit transmits the user information over the communication network.

The processing unit 108 communicatively configured with the database 104 in order to perform analysis of the user information received from the wearable unit 102 and further transmits one or more command data to the communication unit integrated with the wearable unit 102. In an embodiment the processing unit 108 analyzes the physical behavior of each wearable devices within the pre-defined geographical area to transmit the alert signals to the other wearable device in case the area is overcrowded. Further, the alert signal also provides the user with the guidance messages in their wearable devices to avoid collision within the overcrowded area. The processing unit 108 further computes and communicates the direction of the second wearable unit to the first wearable unit present in the geographical area.

The processing unit 108 is implemented based on a number of processor technologies known in the art. Examples of the processing unit 108 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

Figure 2:
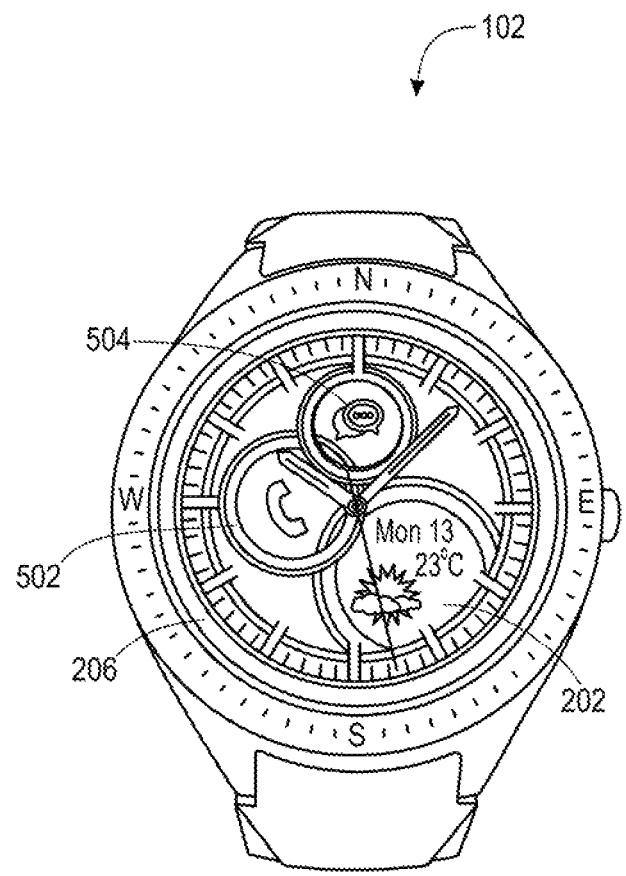
FIG. 2 illustrates a first exemplary view of the wearable unit, in accordance with at least one embodiment.

FIG. 2 illustrates a first exemplary view of the wearable unit 102, in accordance with at least one embodiment. The first exemplary view of the wearable unit 102 displays the current date and time 202. Further the wearable unit 102 includes a first sensor (not shown in FIG. 2) to detect the quality of the air around the environment of the user, and a camera unit (not shown in FIG. 2) to capture an image. The wearable unit 102 includes a speaker unit (not shown in FIG. 2) in order to announce the command received from the processing unit 108. In an embodiment the display screen 206 of the wearable unit 102 is touch sensitive.

The wearable unit 102 worn by each of the user. The control unit establishes a communication between the two or more wearable units 102 bearing different users IDs. The one or more sensor includes a GPS unit (not shown in FIGS.) to track the location of the wearable units 102. The processing unit 108 identifies the location of each wearable units 102 via the Global Navigation Satellite System (GNSS) receivers using the GPS unit.

Further, the wearable unit 102 is protected by a waterproof mechanism such as IP67. The NFC unit (not shown in FIGS.) to enable the user to access of a public transport within the pre-defined geographical area. The NFC unit provides the user with convenient and user friendly access to the public transportation during religious or public gathering events.

Further, the wearable unit 102 includes an alert module 502, a message module 504, and a battery module (not shown in Fig.) integrated with the wearable unit 102, in accordance with at least one embodiment. The alert module 502 enables the user to initiate an alert signal, or a call in case of an emergency. The message module displays the message received by the other user wearing the wearable unit 102 and also the message received by the processing unit 108. The battery module 506 displays the level of battery or energy available in the wearable unit 102 so as to the user has visibility of the battery level.

Figure 3:
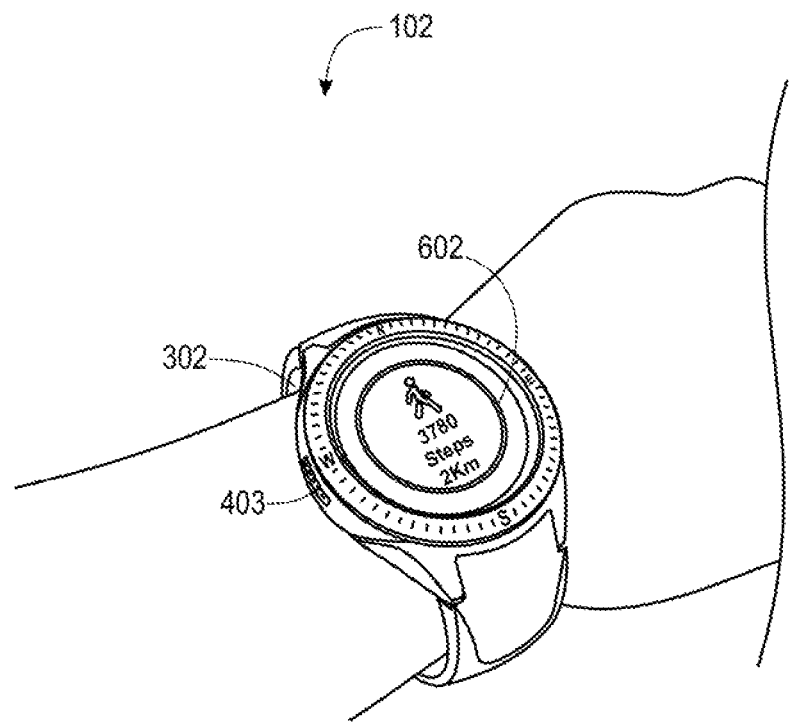
FIG. 3 illustrates the second exemplary view of the wearable unit, in accordance with at least one embodiment.

FIG. 3 illustrates second exemplary view of the wearable unit 102, in accordance with at least one embodiment. The second exemplary view of the wearable unit 102 displays the second sensor 302 (behind back panel of the wearable unit 102) that detects the heart rate and blood oxygen level of the user. Further the wearable unit 102 includes a security wrist band integrated with tamper alert module to initiate a signal in case of tempering the wearable unit 102 by any unauthorized person.

Additionally, the wearable unit 102 includes a charging contacts module 403 in order to get charge the battery of the wearable unit 102 wirelessly. In an embodiment the battery of the wearable unit 102 may charge by the solar energy. The wearable unit 102 includes a health module 602 integrated with the wearable unit 102, in accordance with at least one embodiment; and physiological information. The health module 602 displays the physiological conditions of the user in terms of quantified value based on the user's information analyzed by the one or more sensors.

Figure 4:
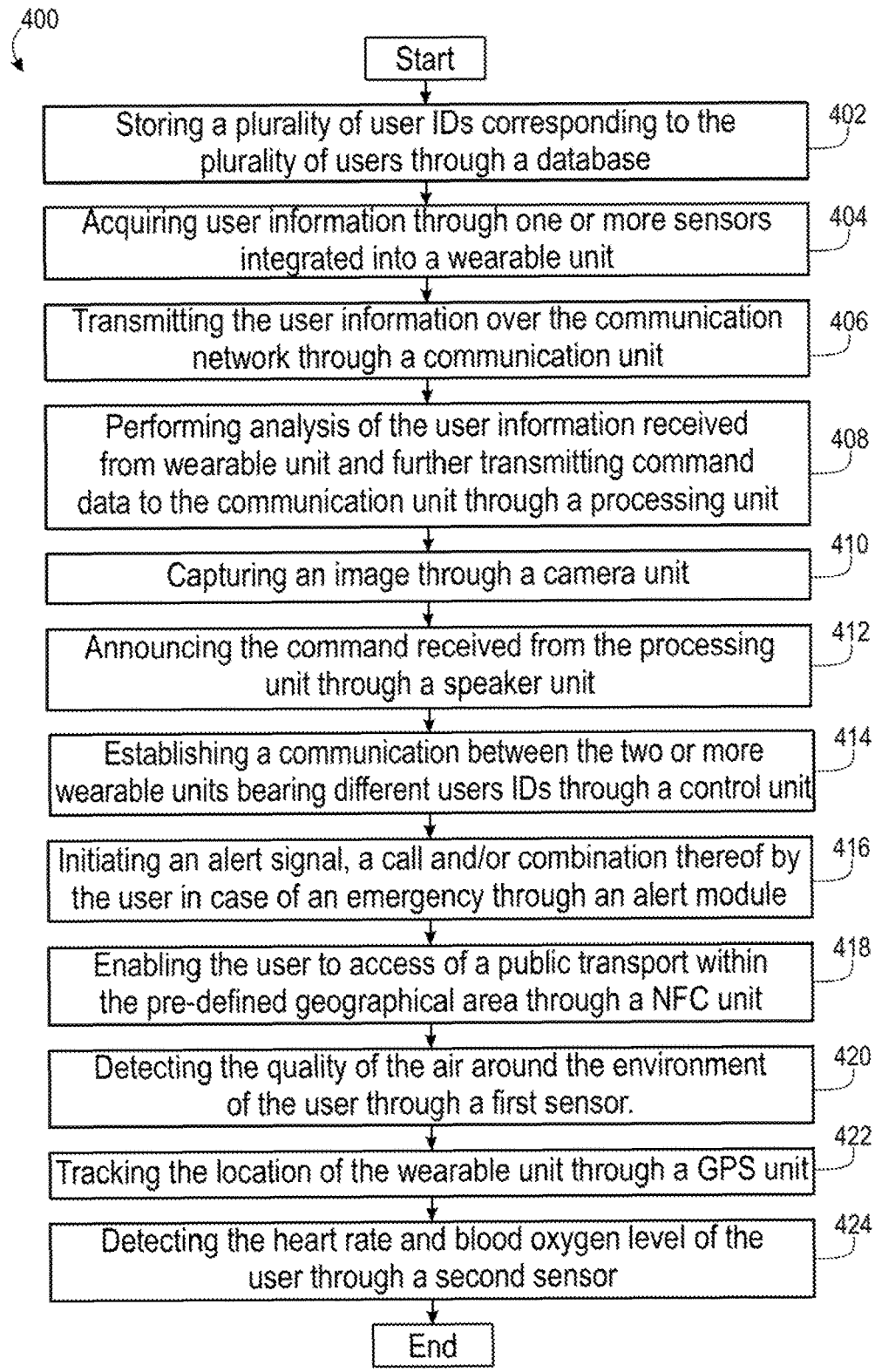
FIG. 4 illustrates a flowchart of the method for analyzing information pertaining to a plurality of users for managing the movement of the plurality of users present in a pre-defined geographical area over a communication network, in accordance with at least one embodiment.

FIG. 4 illustrates a flowchart of the method 400 for analyzing information pertaining to a plurality of users for managing the movement of the plurality of users present in a pre-defined geographical area over a communication network, in accordance with at least one embodiment. The method 400 initiates with the step 402 of storing a plurality of user IDs corresponding to the plurality of users through a database configured with the communication network.

The method 400 then includes the step 404 of acquiring user information through one or more sensors integrated into a wearable unit operatively connected to the communication network. The wearable unit has a unique user ID and the user information includes at least one of: physiological information, quality of air around user, and location of the user. Then the method 400 includes the step 406 of transmitting the user information over the communication network through a communication unit.

Further the method 400 includes the step 408 of performing analysis of the user information received from the wearable unit and further transmitting one or more command data to the communication unit through a processing unit communicatively configured with the database. Furthermore, the method 400 includes the step 410 of capturing an image through a camera unit. Thereafter the method 400 includes the step 412 of announcing the command received from the processing unit through a speaker unit.

Furthermore, the method 400 includes the step 414 of establishing a communication between the two or more wearable units bearing different users IDs through a control unit. The method 400 then includes the step 416 of initiating an alert signal, a call and/or combination thereof by the user in case of an emergency through an alert module. The wearable unit is protected by a waterproof mechanism.

Additionally, the method 400 includes the step 418 of enabling the user to access of a public transport within the pre-defined geographical area through a NFC unit. Further, the method 400 includes the step 420 of detecting the quality of the air around the environment of the user through a first sensor. Thereafter, the method 400 includes the step 422 of tracking the location of the wearable unit through a GPS unit. Finally, the method 400 includes the step 424 of detecting the heart rate and blood oxygen level of the user through a second sensor.

Thus the present system 100 enables the authorities to store the name and personal information of the each user or visitor attending the public gathering for managing the crowd. The present invention also provides synchronization between all the visitors attending the gathering and enable the each group member to be in contact within the pre-defined geographical area. The present wearable unit 102 is elegant and solid. Further the present system 100 provides the group safety for the visitors and guide them to find the lost member of their group under a large crowded situation by showing the distance of the lost person. The present system 100 provides dynamic crowd control by informing alerting the user in real-time.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

The invention claimed is:

1. A system for analyzing information pertaining to a plurality of users for managing the movement of the plurality of users present in a pre-defined geographical area over a communication network, the system comprising:
    a database configured with the communication network to store a plurality of user IDs corresponding to the plurality of users;
    a wearable unit operatively connected to the communication network comprising:

one or more sensors to acquire user information, wherein the wearable unit has a unique user ID and the user information includes at least one of: physiological information, quality of air around user, and location of the user; and a communication unit to transmit the user information over the communication network;

a processing unit communicatively configured with the database in order to perform analysis of the user information received from the wearable unit and further transmits one or more command data to the communication unit.

2. The system according to claim 1, wherein the wearable unit includes a camera unit to capture an image.

3. The system according to claim 1, wherein the wearable unit includes a speaker unit in order to announce the command received from the processing unit.

4. The system according to claim 1, wherein the wearable unit worn by each of the user.

5. The system according to claim 1, wherein the wearable unit includes a control unit to establish a communication between the two or more wearable units bearing different users IDs.

6. The system according to claim 1, wherein the wearable unit includes an alert module in order to initiate an alert signal, a call and/or combination thereof by the user in case of an emergency.

7. The system according to claim 1, wherein the wearable unit is protected by a waterproof mechanism.

8. The system according to claim 1, wherein the wearable unit includes a NFC unit to enable the user to access of a public transport within the pre-defined geographical area.

9. The system according to claim 1, wherein the one or more sensor comprising:

a first sensor to detect the quality of the air around the environment of the user, a OPS unit to track the location of the wearable unit; and a second sensor to detect the heart rate and blood oxygen level of the user.

10. A method for analyzing information pertaining to a plurality of users for managing the movement of the plurality of users present in a pre-defined geographical area over a communication network, the method comprising the steps of:

storing a plurality of user IDs corresponding to the plurality of users through a database configured with the communication network;

acquiring user information through one or more sensors integrated into a wearable unit operatively connected to the communication network, wherein the wearable unit has a unique user TD and the user information includes at least one of; physiological information, quality of air around user, and location of the user, transmitting the user information over the communication network through a communication unit;

performing analysis of the user information received from the wearable unit and further transmitting one or more command data to the communication unit through a processing unit communicatively configured with the database.

11. The method according to claim 10 further includes the step of capturing an image through a camera unit.

12. The method according to claim 10 further includes the step of announcing the command received from the processing unit through a speaker unit.

13. The method according to claim 10, wherein the wearable unit worn by each of the user.

14. The method according to claim 10 further includes the step of establishing a communication between the two or more wearable units bearing different users IDs through a control unit.

15. The method according to claim 10 further includes the step of initiating an alert signal, a call and/or combination thereof by the user in case of an emergency through an alert module.

16. The method according to claim 10, wherein the wearable unit is protected by a waterproof mechanism.

17. The method according to claim 10 further includes the step of enabling the user to access of a public transport within the pre-defined geographical area through a NFC unit.

18. The method according to claim 10 further includes the step of detecting the quality of the air around the environment of the user through a first sensor.

19. The method according to claim 10 further includes the step of tracking the location of the wearable unit through a OPS unit.

20. The method according to claim 10 further includes the step of detecting the heart rate and blood oxygen level of the user through a second sensor.

* * * * *